(12) United States Patent
Jain et al.

(10) Patent No.: US 8,189,488 B2
(45) Date of Patent: May 29, 2012

(54) FAILBACK TO A PRIMARY COMMUNICATIONS ADAPTER

(75) Inventors: Vinit Jain, Austin, TX (US); Jorge Rafael Nogueras, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 12/059,650

(22) Filed: Mar. 31, 2008

(65) Prior Publication Data
US 2008/0178035 A1 Jul. 24, 2008

Related U.S. Application Data

(63) Continuation of application No. 10/920,906, filed on Aug. 18, 2004, now abandoned.

(51) Int. Cl.
*G01R 31/08* (2006.01)
(52) U.S. Cl. ............................ 370/245; 370/218; 710/62
(58) Field of Classification Search .......... 370/216–229, 370/235, 241–245, 248, 389, 463, 465; 714/2–5; 340/3.43, 3.44, 825.01; 710/8, 62; 709/225–229
See application file for complete search history.

(56) References Cited

U.S. PATENT DOCUMENTS

| | | | | |
|---|---|---|---|---|
| 5,517,488 A | * | 5/1996 | Miyazaki et al. | 370/225 |
| 6,006,342 A | * | 12/1999 | Beardsley et al. | 714/5 |
| 6,101,543 A | * | 8/2000 | Alden et al. | 709/229 |
| 6,658,018 B1 | * | 12/2003 | Tran et al. | 370/465 |
| 7,111,084 B2 | * | 9/2006 | Tan et al. | 710/15 |
| 2003/0236852 A1 | | 12/2003 | Fernandes et al. | |
| 2004/0078632 A1 | * | 4/2004 | Infante et al. | 714/5 |
| 2004/0162901 A1 | * | 8/2004 | Mangipudi et al. | 709/225 |
| 2005/0249123 A1 | * | 11/2005 | Finn | 370/242 |

OTHER PUBLICATIONS

U.S. Appl. No. 10/777,715, filed Feb. 12, 2004, Banerjee et al.
Lindsay et al. Concurrent Operation of Two Channel Adapters; Jan. 1975; pp. 2479-2483; TDB; US.

* cited by examiner

*Primary Examiner* — Derrick Ferris
*Assistant Examiner* — Matthew Hopkins
(74) *Attorney, Agent, or Firm* — DeLizio Gilliam, PLLC

(57) ABSTRACT

Methods, systems, and program products are provided for failback to a primary communications adapter. Embodiments of the present invention include receiving, in a driver for a primary communications adapter and a backup communications adapter, a link up event for the primary communications adapter; inferring that the primary communications adapter is capable of receiving packets; setting the backup communications adapter to idle; and activating the primary communications adapter. In typical embodiments, the primary communications adapter includes a plurality of linked communications adapters comprising an EtherChannel pseudo-adapter.

12 Claims, 5 Drawing Sheets

FAILBACK TO A PRIMARY COMMUNICATIONS ADAPTER

CROSS-REFERENCE TO RELATED APPLICATION

This application is a continuation application of and claims priority from U.S. patent application Ser. No. 10/920,906, filed on Aug. 18, 2004, which is now abandoned.

BACKGROUND OF THE INVENTION

1. Field of the Invention

The field of the invention is data processing, or, more specifically, methods, systems, and products for failback to a primary communications adapter.

2. Description of Related Art

EtherChannel is a link aggregation technology that allows several Ethernet adapters to be aggregated together to form a single pseudo-Ethernet adapter having increased bandwidth and fault-tolerance. All the aggregated adapters in the Ether-Channel are typically given the same link layer address and are treated by remote systems as a single adapter. One benefit of EtherChannel is that the aggregated adapters have the network bandwidth of all of their adapters in a single network presence. If a single adapter fails, network traffic is automatically sent on the next available adapter in the EtherChannel without disruption to existing user connections.

Although failure of the EtherChannel is less likely than the failure of a single Ethernet adapter, failure of the EtherChannel does occur. To provide failover protection for the Ether-Channel, typically a backup Ethernet adapter remains idle until all the primary adapters in the EtherChannel fail. When the primary adapters in the EtherChannel fail, the backup adapter is activated and administers all Ethernet traffic until at least one of the primary adapters recovers. When at least one of the primary adapters recovers, the primary channel is again available for all traffic and the backup adapter is reset to its idle state.

It is desirable to return Ethernet traffic across the primary EtherChannel as soon as the primary EtherChannel recovers, because the EtherChannel has more bandwidth than the backup adapter. Conventional EtherChannel drivers provide automatic failover to a backup adapter and dynamic reconfiguration of the primary EtherChannel. Dynamic reconfiguration of the primary EthernetChannel typically includes re-establishing electrical connectivity in the physical layer Ethernet adapter and initializing the ports connecting LAN segments in the link layer. When electrical connectivity to the adapter is established the adapter sends a 'link up event' to the EtherChannel driver. Although there is electrical connectivity to the physical layer Ethernet adapter, the Ethernet adapter is not capable of sending packets until dynamic reconfiguration process initializes the ports connecting segments in the LAN, thereby allowing packets received through the adapter to be forwarded in the LAN. Failback to the primary EtherChannel before the primary adapters are capable of sending packets results in lost packet traffic. There is therefore a need for improved failback to a primary communications adapter.

SUMMARY OF THE INVENTION

Methods, systems, and program products are provided for failback to a primary communications adapter. Embodiments include receiving, in a driver for a primary communications adapter and a backup communications adapter, a link up event for the primary communications adapter; inferring that the primary communications adapter is capable of receiving packets; setting the backup communications adapter to idle; and activating the primary communications adapter. In typical embodiments, the primary communications adapter includes a plurality of linked communications adapters that include an EtherChannel pseudo-adapter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for failback to a primary communications adapter. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Failback to a Primary Communications Adapter

Figure 1:
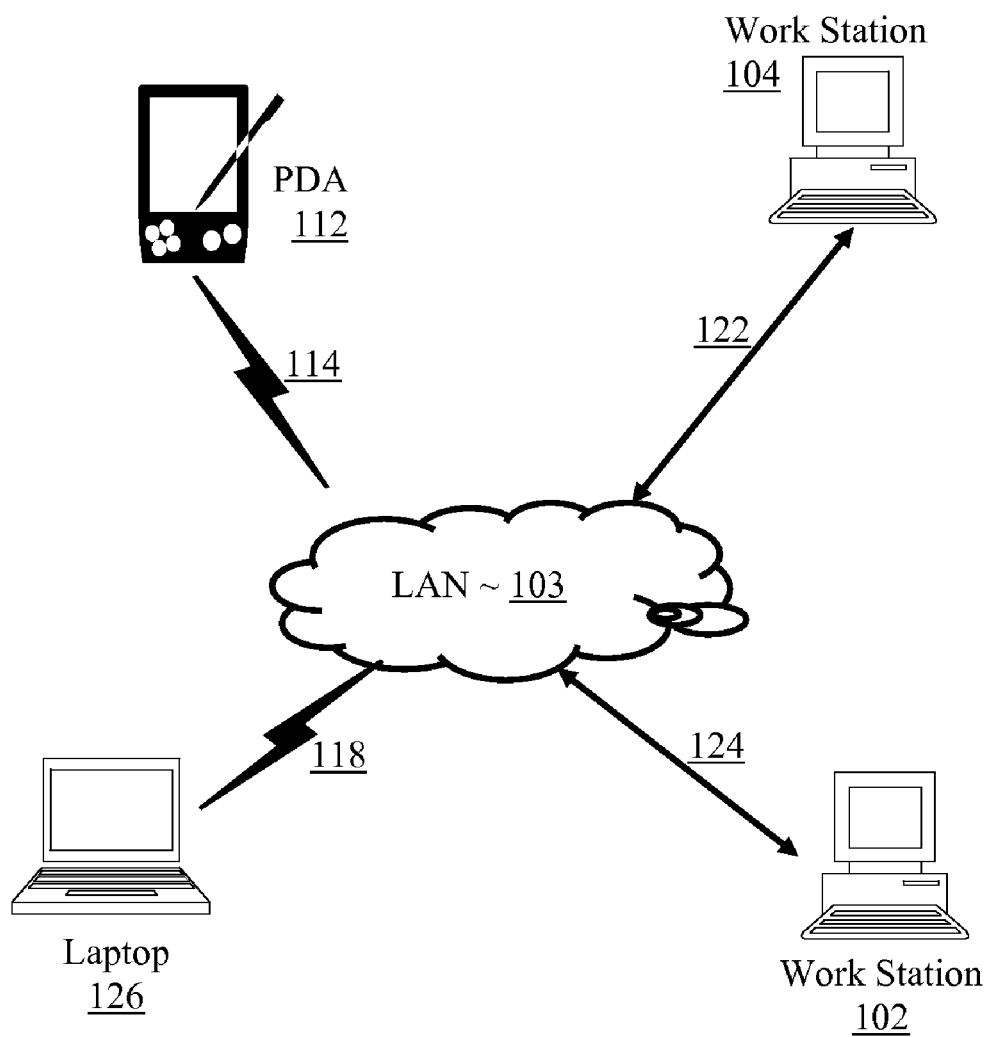
FIG. 1 sets forth a line drawing of a data processing architecture in which various embodiments of the present invention may be implemented.

Exemplary methods, systems, and products for failback to a primary communications adapter are now explained with reference to the accompanying drawings, beginning with FIG. 1. FIG. 1 sets forth a line drawing of a data processing architecture in which various embodiments of the present invention may be implemented. The data processing system of FIG. 1 includes a number of computers connected for data communications in a network. The data processing system of FIG. 1 includes a local area network ("LAN") (103). The network connection aspect of the architecture of FIG. 1 is only for explanation, not for limitation. Such networks are media that may be used to provide data communications connections between various devices and computers connected together within an overall data processing system.

In the example of FIG. 1, several exemplary devices including a PDA (112), workstation (104), a laptop (126) and a workstation (102) are connected to a LAN (103). The PDA (112) connects to the LAN (103) through a wireless link (114). In the example of FIG. 1, the workstation (104) connects through a wireline connection (122) to the LAN (103). The exemplary laptop (126) connects through wireless link (118) to the LAN (103), and the exemplary workstation (102) connects through wireline connection (124) to the LAN (103).

Each device in the example of FIG. 1 is capable of implementing data communications through the communications adapters. Each device in the example of FIG. 1 is also capable of maintaining at least one communication adapter as a backup adapter and automatic failover to the backup communication adapter when the primary communication adapter fails. In this specification, the term 'failover' means activating the backup communication adapter in the event the primary adapter or primary adapters fail. Communications adapters implement the hardware level of connections for data communications through which local devices and remote devices or servers send data communications directly to one another and through networks. The communications adapters installed in the devices of FIG. 1 are typically capable of being activated by a communications adapter driver to receive packets and pass them up the protocol stack or to be set to idle in which case packets are received but they not passed up the protocol stack. Instead, the packets are discarded. Examples of communications adapters that may operate according to embodiments of the present invention include modems for wired dial-up connections, Ethernet (IEEE 802.3) adapters for wired LAN connections, and 802.11b adapters for wireless LAN connections.

Each device in the example of FIG. 1 is also capable of failback to a primary communications adapter according to embodiments of the present invention to return packet traffic from a backup communications adapter to the primary communications adapter. In this specification, the term 'failback' means reactivating, after recovery, the primary adapter or primary adapters and setting the backup adapter to idle. Failback to a primary communications adapter according to embodiments of the present invention operates generally by receiving, in a driver for a primary communications adapter and a backup communications adapter, a link up event for the primary communications adapter; inferring that the primary communications adapter is capable of receiving packets; setting the backup communications adapter to idle; and activating the primary communications adapter.

The arrangement of servers and other devices making up the architecture illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, such as, for example, TCP/IP, HTTP, WAP, HDTP, and others as will occur to those of skill in the art. Various embodiments of the present invention may be implemented on a variety of hardware platforms in addition to those illustrated in FIG. 1.

Figure 2:
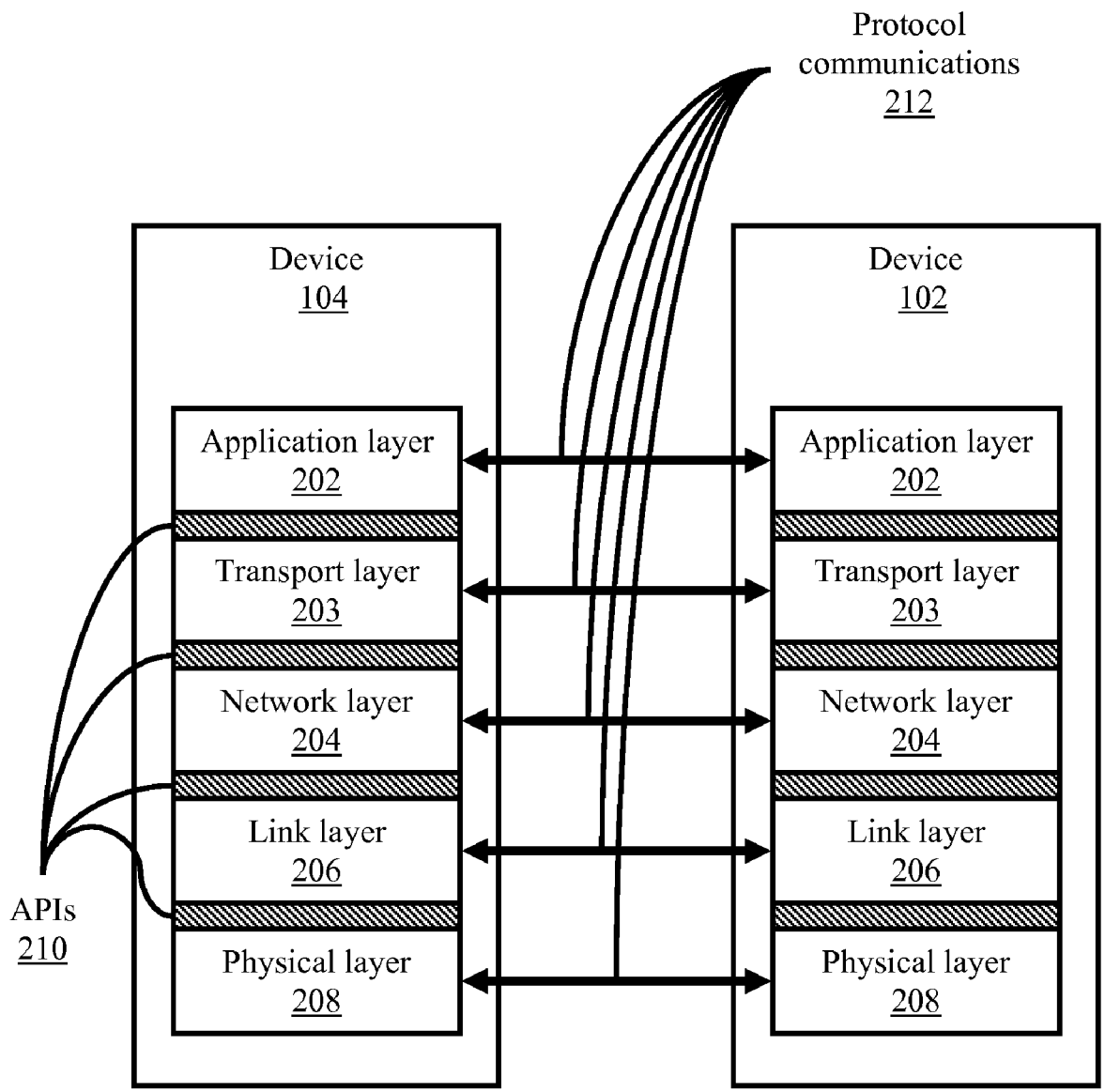
FIG. 2 sets forth a block diagram of an exemplary protocol stack for data communications between two devices connected through a network.

For further explanation, FIG. 2 sets forth a block diagram of an exemplary protocol stack for data communications between two devices connected through a network. The exemplary protocol stack of FIG. 2 is based loosely on the standard Open Systems Interconnection ("OSI") Reference Model, presented here only for further explanation. The exemplary protocol stack of FIG. 2 includes several protocols stacked in layers. The exemplary protocol stack of FIG. 2 begins at the bottom with a physical layer (208) that delivers unstructured streams of bits across links between devices. Physical layer connections may be implemented as wireline connections through modems or wireless connections through wireless communications adapters, for example. The exemplary stack of FIG. 2 includes a link layer (206) that delivers a piece of information across a single link. The link layer organizes the physical layer's bits into packets and controls which device on a shared link gets each packet. The Ethernet protocol represents a link layer protocol. Ethernet addresses are 48 bit link layer addresses assigned uniquely to linked devices. A group of devices linked through a link layer protocol are often referred to as a LAN. An IEEE committee in one popular standard split the link layer in two sublayers, the first of which, called the MAC layer (for 'media access control') addresses issues specific to a particular type of LAN—so that a link layer address is often referred to as a 'MAC addresses.' The present specification, however, is not limited to any particular kind of LAN and therefore refers to link layer addresses as 'link layer addresses.'

Because each link layer address is unique to a device on a LAN, the link layer protocol (206) operates generally by circulating all messages packets on a LAN to each device connected to the LAN. Each packet includes a destination link layer address. Each device is then responsible for examining each packet, and discarding those not addressed to the device, and passing those that are addressed to the device up the protocol stack for further handling.

The stack of FIG. 2 includes a network layer (204) that computes paths across an interconnected mesh of links and packet switches and forwards packets over multiple links from source to destination. In this specification, packet switches operating in the network layer are referred to as "routers." The stack of FIG. 2 includes a transport layer (203) that supports a reliable communication stream between a pair of devices across a network by putting sequence numbers in packets, holding packets at the destination until all arrive, and retransmitting lost packets. The stack of FIG. 2 also includes an application layer (202) where application programs reside that use the network. Examples of such application programs include web browsers, email clients, and others that will occur to those of skill in the art.

Data communications (212) in such a stack model is viewed as occurring layer by layer between devices, in this example, between devices (102, 104). That is, data communication between the devices in the physical layer is viewed as occurring only in the physical layer, communication in the link layer is viewed as occurring horizontally between the devices only in the link layer, and so on.

Vertical communication through among the protocols in the stack is viewed as occurring through application programming interfaces ("APIs") (210) provided for that purpose. A browser, for example, operating as an application program in the application layer views its communications as coming and going directly to and from its counterpart web server on another device across the network. The browser effects its data communication by calls to a sockets API that in turn operates a transmission control protocol ("TCP") client in the transport layer. The TCP client breaks a message into packets, gives each packet a transport layer header that includes a sequence number, and sends each packet to its counterpart on another device through an API call to the network layer. The network layer may implement, for example, the well known Internet Protocol ("IP") which give each packet an IP header and selects a communication route through the network for each packet, and transmits each packet to its counterpart on another device by calling down through its link layer API, typically implemented as a driver API for a data communication adapter such as a network interface card or "NIC." When receiving data communication, the process is reversed. Each layer strips off its header and passes a received packet up through the protocol stack. Upward passes above the link layer typically require operating system context switches.

Figure 3:
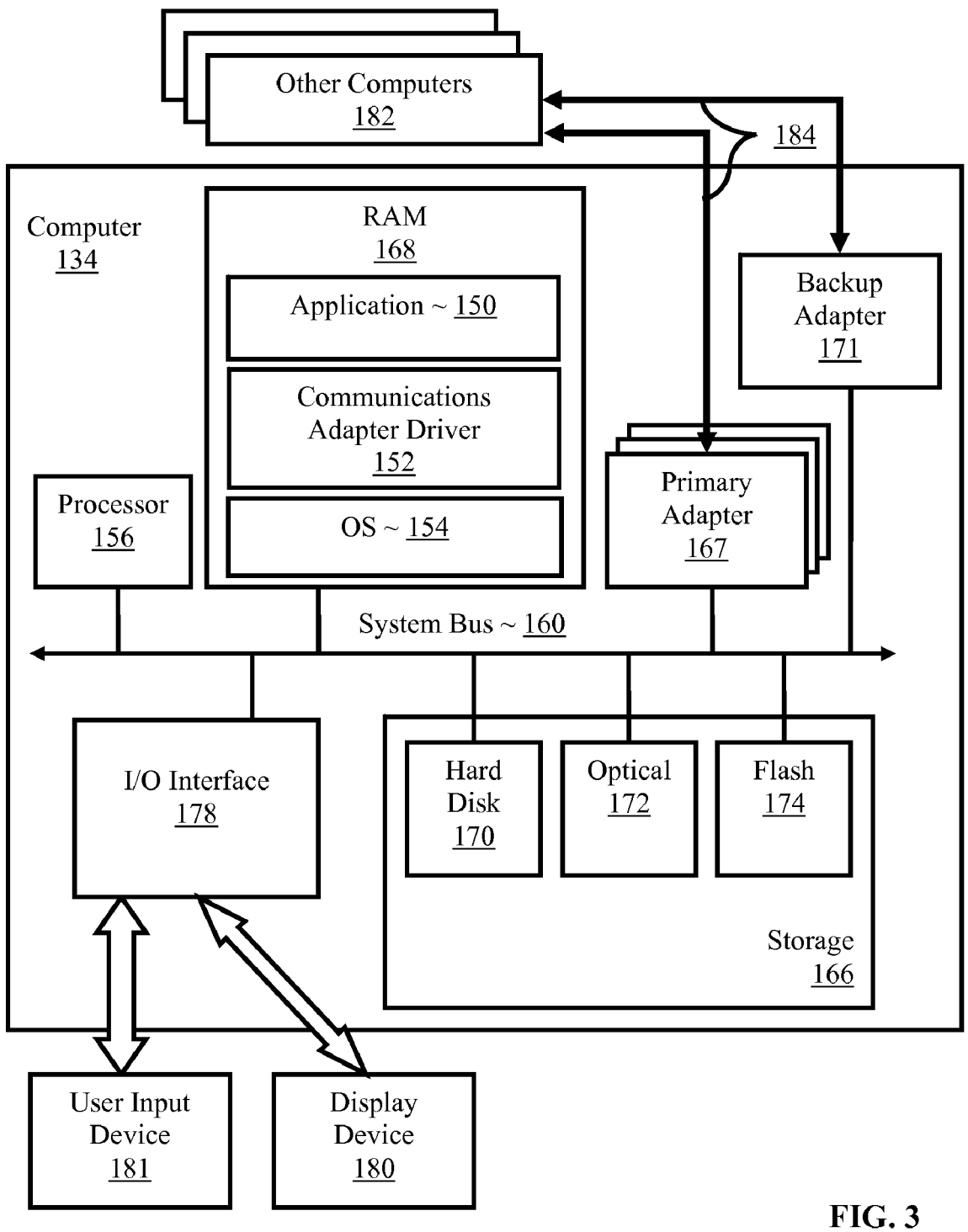
FIG. 3 sets forth a block diagram of automated computing machinery comprising a computer useful in implementing failback to a primary communications adapter according to embodiments of the present invention.

As mentioned above, devices capable of failback to a primary communications adapter according to embodiments of the present invention are generally implemented as automated computing machinery. For further explanation, FIG. 3 sets forth a block diagram of automated computing machinery comprising a computer (134) useful in implementing failback to a primary communications adapter according to embodiments of the present invention. The example computer (134) of FIG. 3 includes a plurality of linked primary communications adapter (167) for implementing connections for data communications (184), including connection through networks, to other computers (182). In the example of FIG. 3 the primary communications adapter comprises a plurality of Ethernet adapters aggregated together to form an EtherChannel. EtherChannel is a link aggregation technology that allows several Ethernet adapters to be aggregated together to form a single pseudo-Ethernet adapter having increased bandwidth and fault-tolerance. One benefit of EtherChannel is that the aggregated adapters have the network bandwidth of all of their adapters in a single network presence.

The example computer (134) of FIG. 3 also includes a backup communications adapter (171) for implementing connections for data communications (184), including connection through networks, to other computers (182). In the example of FIG. 3 the backup communications adapter is an Ethernet adapter that is typically set to idle unless the primary EtherChannel (167) has failed.

Although the exemplary communications adapters of FIG. 3 are described with reference to Ethernet adapters, this is for explanation and not for limitation. In fact, other communications adapters useful in failback for primary communications adapters can include modems for wired dial-up connections, 802.11b adapters for wireless LAN connections, as well as others that will occur to those of skill in the art. The computer (134) of FIG. 3 includes at least one computer processor (156) or 'CPU' as well as random access memory (168) ("RAM"). Stored in RAM (168) is an application program (150). Examples of such application programs include web browsers, email clients, and others that will occur to those of skill in the art. Also stored in RAM (168) is an operating system (154). Operating systems useful in computers according to embodiments of the present invention include Unix, Linux, Microsoft NT™, and many others as will occur to those of skill in the art.

Also stored in RAM (168) is a communications adapter driver (152). The communications adapter driver (152) is typically a software program that controls the primary communications adapter (167) and the backup communications adapter (171). The communications adapter driver (152) is responsible for receiving and forwarding packets through the primary adapter and passing packets up the protocol stack. When the primary communications adapters (167) fail, the communications adapter driver (152) of FIG. 3 is capable of automatic failover to the backup adapter by activating the backup adapter so that recovery of the primary adapter occurs without interrupting packet traffic.

The exemplary communications adapter driver of FIG. 3 is also capable of failback to the primary communications adapter (167) when the primary communications adapters (167) have recovered. Failback to the primary communications adapter (167) is typically carried out by receiving a link up event for the primary communications adapter, inferring that the primary communications adapter (167) is capable of receiving packets, setting the backup communications adapter (171) to idle, and activating the primary communications adapter (167). A link up event is an event sent by an adapter to the communications adapter driver triggered by new or restored electrical connectivity to the adapter.

The computer (134) of FIG. 3 includes computer memory storage (166) coupled through a system bus (160) to processor (156) and to other components of the computer. Computer storage (166) may be implemented as a hard disk drive (170), optical disk drive (172), electrically erasable programmable read-only memory space (so-called 'EEPROM' or 'Flash' memory) (174), or as any other kind of computer memory as will occur to those of skill in the art.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 4:
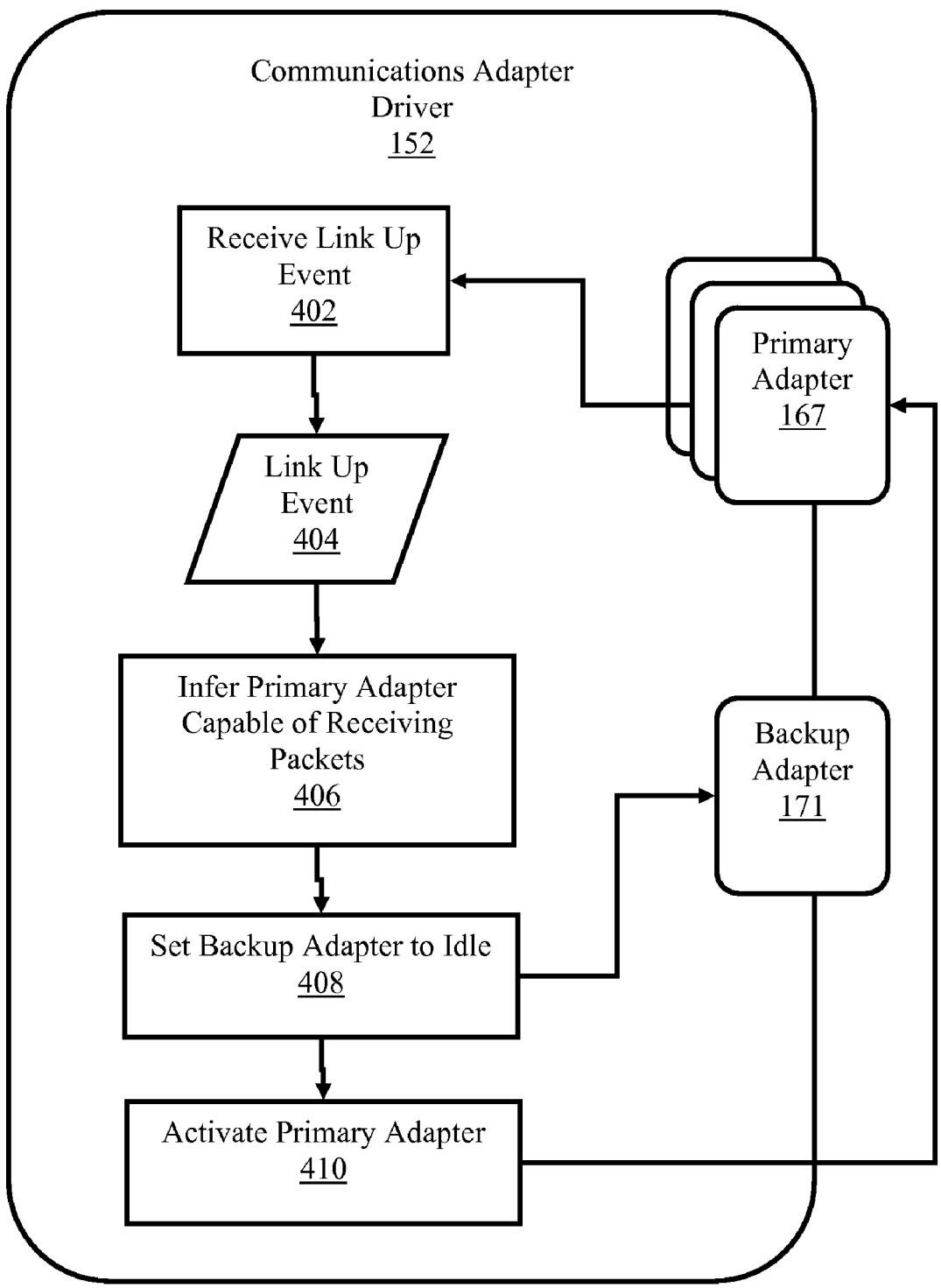
FIG. 4 sets forth a flow chart illustrating an exemplary method for failback to a primary communications adapter.

For further explanation, FIG. 4 sets forth a flow chart illustrating an exemplary method for failback to a primary communications adapter. In the example of FIG. 4, the primary communications adapter includes plurality of linked communications adapters that comprise an EtherChannel pseudo-adapter.

The method of FIG. 4 also includes receiving (402), in a driver (152) for a primary communications adapter (167) and a backup communications adapter (171), a link up event (404) for the primary communications adapter (167). As discussed above, a link up event is an event received in a communications adapter driver during a dynamic reconfiguration process following failover to the backup adapter. The link up event represents electrical connectivity to the adapter. A link up event represents only electrical connectivity to the adapter in the physical layer of the protocol stack, but does not guarantee that the ports connecting segments in the LAN are yet initialized as part of a dynamic reconfiguration process. Until a dynamic reconfiguration process initializes the ports, no switch operating in the link layer can receive and forward packets through the primary adapter. The method of FIG. 4 therefore includes inferring (406) that the primary communications adapter (167) is capable of receiving packets. One way of inferring that the primary communications adapter is capable of receiving packets is carried out by waiting a predetermined period of time after receiving the link up event for the primary communications adapter. In such examples, waiting a predetermined period of time after receiving the link up event for the primary communications adapter typically includes waiting a predetermined period of time typical for a dynamic reconfiguration process to initialize the ports connecting segments of the LAN. As will occur to those of skill in the art, the predetermined period of time required to initialize such ports will vary according to many hardware factors and software factors associated with the system on which the primary adapter is installed as will occur to those of skill in the art.

Figure 5:
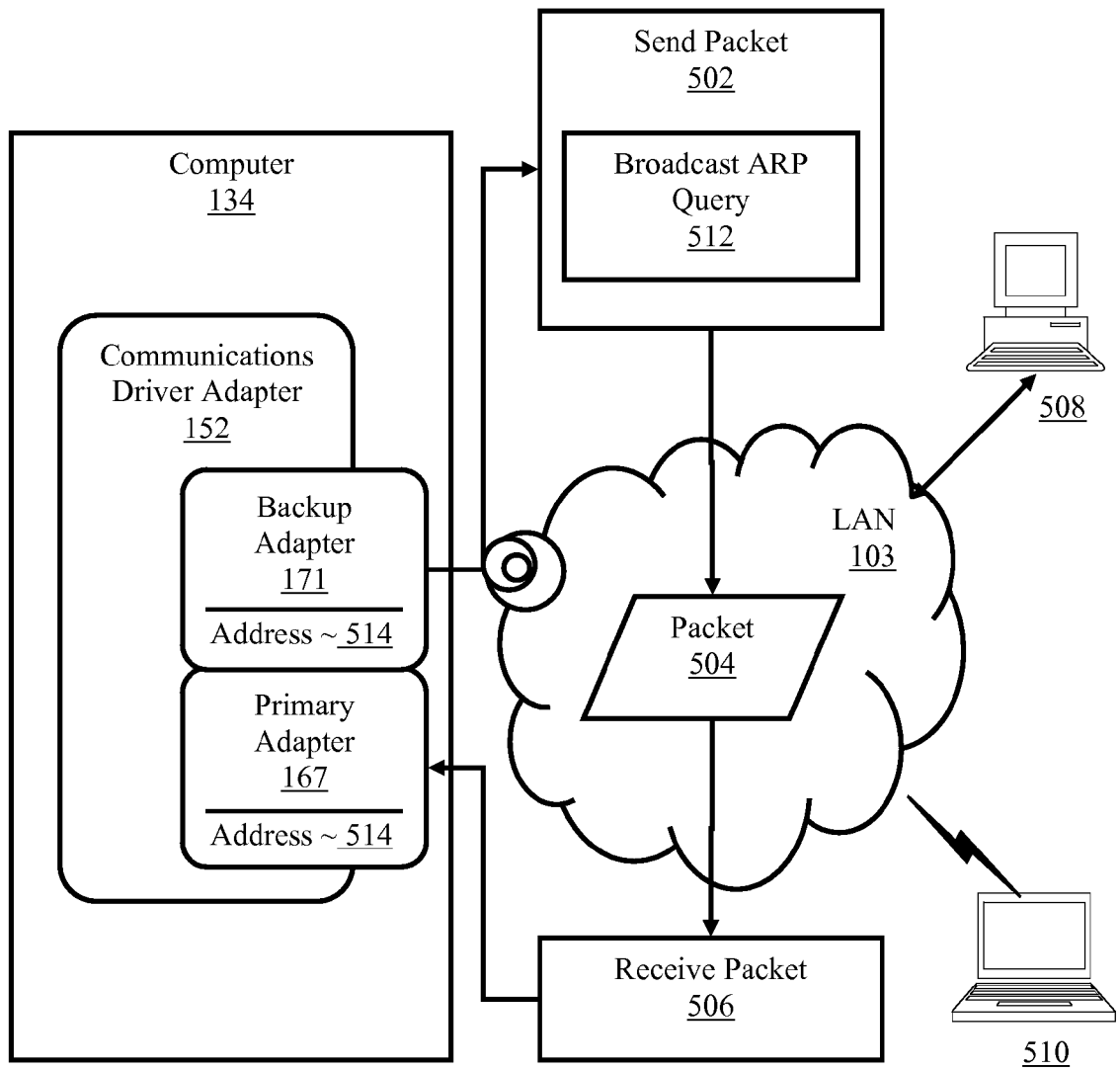
FIG. 5 sets forth a flow chart illustrating another exemplary method for inferring that the primary communications adapter is capable of receiving packets.

For further explanation, FIG. 5 sets forth a flow chart illustrating another exemplary method for inferring that the primary communications adapter is capable of receiving packets. The method of FIG. 5 includes sending (502) a packet (504) from the backup communications adapter (171) to the primary communications adapter (167). In the method of FIG. 5, sending (502) a packet (504) from the backup communications adapter (171) to the primary communications adapter (167) is carried out by broadcasting (512) an ARP packet to all link layer addresses (508, 510, 514) on a LAN (103). In the method of FIG. 5, broadcasting (512) an ARP packet to all link layer addresses (508, 510, 514) on a LAN (103) includes broadcasting either an ARP query or an ARP reply to all link layer addresses on the LAN.

The method of FIG. 5 also includes receiving (506) the packet (504) in the primary communications adapter (167). If the ARP packet is received in the primary adapter (167), then the primary adapter is capable of receiving packets and is ready to be activated.

In the method of FIG. 5, the packet received in the primary communications adapter was sent by the backup communications adapter. This is for explanation only, and not for limitation. In fact, a packet received in the primary communications adapter may be sent from any adapter on any computer and the receipt of that packet confirms that the adapter is in fact capable of receiving packets and therefore, failback to the primary communications adapter should proceed.

If the primary communications adapter is capable of receiving packets, then it is advantageous to activate the primary communications adapter for receiving packets and return the backup adapter to idle. Continuing again with reference to FIG. 4: The method of FIG. 4 includes setting (408) the backup communications adapter (171) to idle. Setting the backup communications adapter to idle results in receiving packets through the backup adapter and dropping the packets. Packets received through the idle backup adapter are not passed up the protocol stack and therefore are discarded.

The method of FIG. 4 includes activating (410) the primary communications adapter (167). By activating (410) the primary communications adapter (167), packets received through the primary communications adapter are passed up the protocol stack thereby effecting data communications.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for failback to a primary communications adapter, the method comprising:

receiving, in a driver for the primary communications adapter and a backup communications adapter, a link up event for the primary communications adapter, wherein the link up event is sent from the primary communications adapter to the driver, and wherein the link up event is triggered by establishing electrical connectivity to the primary communications adapter;

determining that the primary communications adapter is capable of receiving packets;

setting the backup communications adapter to idle, wherein the backup communications adapter receives packets and drops the packets while idle;

activating the primary communications adapter, wherein the primary communications adapter receives packets and passes the packets up a protocol stack while activated;

wherein the primary communication adapter further comprises a plurality of linked communications adapters; and wherein the plurality of linked communication adapters further comprise an EtherChannel pseudo-adapter.

2. The method of claim 1 wherein inferring that the primary communications adapter is capable of receiving packets further comprises:

sending a packet from the backup communications adapter to the primary communications adapter; and receiving the packet in the primary communications adapter.

3. The method of claim 2 wherein sending the packet from the backup communications adapter to the primary communications adapter further comprises broadcasting an ARP packet to all link layer addresses on a LAN.

4. The method of claim 1 wherein inferring that the primary communications adapter is capable of receiving packets further comprises waiting a predetermined period of time after receiving the link up event for the primary communications adapter.

5. A system for failback to a primary communications adapter, the system comprising a computer processor, a computer memory operatively coupled to the computer processor, the computer memory including computer program instructions that, when executed by the processor, cause the system to carry out the steps of:

receiving, in a driver for the primary communications adapter and a backup communications adapter, a link up event for the primary communications adapter, wherein the link up event is sent from the primary communications adapter to the driver, and wherein the link up event is triggered by establishing electrical connectivity to the primary communications adapter;

determining that the primary communications adapter is capable of receiving packets;

setting the backup communications adapter to idle, wherein the backup communications adapter receives packets and drops the packets while idle;

activating the primary communications adapter, wherein the primary communications adapter receives packets and passes the packets up a protocol stack while activated;

wherein the primary communication adapter further comprises a plurality of linked communications adapters; and wherein the plurality of linked communication adapters further comprise an EtherChannel pseudo-adapter.

6. The system of claim 5 wherein inferring that the primary communications adapter is capable of receiving packets further comprises:

sending a packet from the backup communications adapter to the primary communications adapter; and receiving the packet in the primary communications adapter.

7. The system of claim 6 wherein sending the packet from the backup communications adapter to the primary communications adapter further comprises broadcasting an ARP packet to all link layer addresses on a LAN.

8. The system of claim 5 wherein inferring that the primary communications adapter is capable of receiving packets further comprises waiting a predetermined period of time after receiving the link up event for the primary communications adapter.

9. A computer program product for failback to a primary communications adapter, the computer program product disposed in a non-transitory recordable storage medium, the computer program product including computer program instructions for:

receiving, in a driver for the primary communications adapter and a backup communications adapter, a link up event for the primary communications adapter, wherein the link up event is sent from the primary communications adapter to the driver, and wherein the link up event is triggered by establishing electrical connectivity to the primary communications adapter;

determining that the primary communications adapter is capable of receiving packets;

setting the backup communications adapter to idle, wherein the backup communications adapter receives packets and drops the packets while idle;

activating the primary communications adapter, wherein the primary communications adapter receives packets and passes the packets up a protocol stack while activated;

wherein the primary communication adapter further comprises a plurality of linked communications adapters; and wherein the plurality of linked communication adapters further comprise an EtherChannel pseudo-adapter.

10. The computer program product of claim 9 wherein inferring that the primary communications adapter is capable of receiving packets further comprises:

sending a packet from the backup communications adapter to the primary communications adapter; and receiving the packet in the primary communications adapter.

11. The computer program product of claim 10 wherein sending the packet from the backup communications adapter to the primary communications adapter further comprises broadcasting an ARP packet to all link layer addresses on a LAN.

12. The computer program product of claim 9 wherein inferring that the primary communications adapter is capable of receiving packets further comprises waiting a predetermined period of time after receiving the link up event for the primary communications adapter.

* * * * *